US012608063B2

(12) United States Patent
Kim et al.

(10) Patent No.: US 12,608,063 B2
(45) Date of Patent: Apr. 21, 2026

(54) POWER SUPPLY CIRCUIT AND ELECTRONIC DEVICE COMPRISING SAME

(71) Applicant: Samsung Electronics Co., Ltd., Suwon-si (KR)

(72) Inventors: Taewoong Kim, Suwon-si (KR); Sehyoung Park, Suwon-si (KR); Youngmi Song, Suwon-si (KR); Woong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 177 days.

(21) Appl. No.: 18/346,462

(22) Filed: Jul. 3, 2023

(65) Prior Publication Data

US 2023/0350474 A1 Nov. 2, 2023

Related U.S. Application Data

(63) Continuation of application No. PCT/KR2022/000354, filed on Jan. 10, 2022.

(30) Foreign Application Priority Data

Jan. 21, 2021 (KR) ........................ 10-2021-0008583

(51) Int. Cl.
*G06F 1/26* (2006.01)
*H02J 7/00* (2026.01)
(52) U.S. Cl.
CPC .......... *G06F 1/263* (2013.01); *H02J 7/00038* (2020.01); *H02J 7/00712* (2020.01)

(58) Field of Classification Search
CPC ........ G06F 1/26; G06F 1/263; H02J 7/00038; H02J 7/00712; H02J 7/04
See application file for complete search history.

(56) References Cited

U.S. PATENT DOCUMENTS

| | | | |
|---|---|---|---|
| 8,362,741 B2 | 1/2013 | Capella | |
| 9,104,396 B2 | 8/2015 | Taki | |
| 9,148,026 B2 | 9/2015 | Gagne et al. | |

(Continued)

FOREIGN PATENT DOCUMENTS

| | | | | |
|---|---|---|---|---|
| CN | 106329630 A | * | 1/2017 | ............... H02J 7/00 |
| CN | 116031964 A | * | 4/2023 | |

(Continued)

OTHER PUBLICATIONS

Korean Office Action dated Sep. 29, 2025, issued in Korean Application No. 10-2021-0008583.

*Primary Examiner* — Phil K Nguyen
*Assistant Examiner* — Cheri L Harrington
(74) *Attorney, Agent, or Firm* — Jefferson IP Law, LLP

(57) ABSTRACT

An electronic device is provided. The electronic device includes a battery, a power supply circuit electrically connected to the battery and configured to charge the battery, a processor controlling the power supply circuit, wherein the processor, when a cable of a charger for charging is connected to the power supply circuit, determines the charging type of the charger through the cable, when the charging type has been determined, determines the target resistance value of the charger, and charges the battery by using a charging mode corresponding to the determined charging type and target resistance value.

19 Claims, 5 Drawing Sheets

(56) References Cited

U.S. PATENT DOCUMENTS

| | | | | |
|---|---|---|---|---|
| 9,470,644 B2 | 10/2016 | Remple et al. | | |
| 10,644,524 B2* | 5/2020 | Shiba | | H02J 7/0045 |
| 2013/0049678 A1* | 2/2013 | Li | | H02J 7/007192 |
| | | | | 320/136 |
| 2015/0123597 A1* | 5/2015 | Son | | H02J 7/0068 |
| | | | | 320/134 |
| 2015/0137791 A1* | 5/2015 | Remple | | G01N 27/00 |
| | | | | 324/76.11 |
| 2015/0357835 A1* | 12/2015 | Naskali | | H02J 7/00 |
| | | | | 307/23 |
| 2016/0062935 A1* | 3/2016 | Talmola | | G06F 1/263 |
| | | | | 710/306 |
| 2017/0141608 A1* | 5/2017 | Stenger | | H02J 7/0045 |
| 2018/0032350 A1* | 2/2018 | Lee | | G06F 1/266 |
| 2018/0062400 A1* | 3/2018 | Wang | | H02J 7/04 |
| 2018/0292880 A1* | 10/2018 | Nakadokoro | | G06F 1/266 |
| 2019/0012284 A1* | 1/2019 | Ma | | G06F 13/4286 |
| 2020/0112068 A1* | 4/2020 | Shimma | | H02J 7/0068 |
| 2021/0123985 A1* | 4/2021 | Suzuki | | G06F 13/4282 |
| 2021/0294757 A1* | 9/2021 | Chen | | H02J 7/00034 |
| 2023/0082918 A1* | 3/2023 | Wei | | H01R 13/20 |
| | | | | 320/108 |
| 2023/0161723 A1* | 5/2023 | Kasichainula | | G06F 13/382 |
| | | | | 710/105 |
| 2023/0170708 A1* | 6/2023 | Xie | | H01R 31/065 |
| | | | | 320/107 |

FOREIGN PATENT DOCUMENTS

| | | |
|---|---|---|
| JP | 2020-060868 A | 4/2020 |
| KR | 10-2007-0031460 A | 3/2007 |
| KR | 10-2013-0035971 A | 4/2013 |
| KR | 10-2015-0052411 A | 5/2015 |
| KR | 10-2018-0020003 A | 2/2018 |
| KR | 10-2018-0085313 A | 7/2018 |
| KR | 10-2020-0008690 A | 1/2020 |

* cited by examiner

POWER SUPPLY CIRCUIT AND ELECTRONIC DEVICE COMPRISING SAME

CROSS-REFERENCE TO RELATED APPLICATION(S)

This application is a continuation application, claiming priority under § 365(c), of an International application No. PCT/KR2022/000354, filed on Jan. 10, 2022, which is based on and claims the benefit of a Korean patent application number 10-2021-0008583, filed on Jan. 21, 2021, in the Korean Intellectual Property Office, the disclosure of which is incorporated by reference herein in its entirety.

BACKGROUND

1. Field

The disclosure relates to an electronic device for charging a battery of the electronic device.

2. Description of Related Art

A portable electronic device may include a battery and operate using power supplied by the battery. A portable electronic device including a battery may need to be charged when a predetermined amount of power or more is used. Using a charger, a battery of a portable electronic device may be charged with a predetermined amount of power. A charging method may vary depending on the charger.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device that determines a charging mode for charging a battery of the electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a battery, a power supply circuit electrically connected to the battery and configured to charge the battery, and a processor, controlling the power supply circuit, configured to, when a cable of a charger for charging is connected to the power supply circuit, determine a charging type of the charger through the cable, when the charging type has been determined, determine a target resistance value of the charger, and charge the battery by using a charging mode corresponding to the determined charging type and target resistance value.

In accordance with another aspect of the disclosure, a method of charging a battery, performed by an electronic device, is provided. The method includes determining a charging type of a charger through a cable of the charger when the cable for charging is connected to a power supply circuit of the electronic device, determining a target resistance value of the charger when the charging type is determined, determining a charging mode corresponding to the determined charging type and target resistance value, and charging the battery using the charging mode.

According to various embodiment of the disclosure s, an electronic device that determines a charging mode for charging a battery of the electronic device is provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
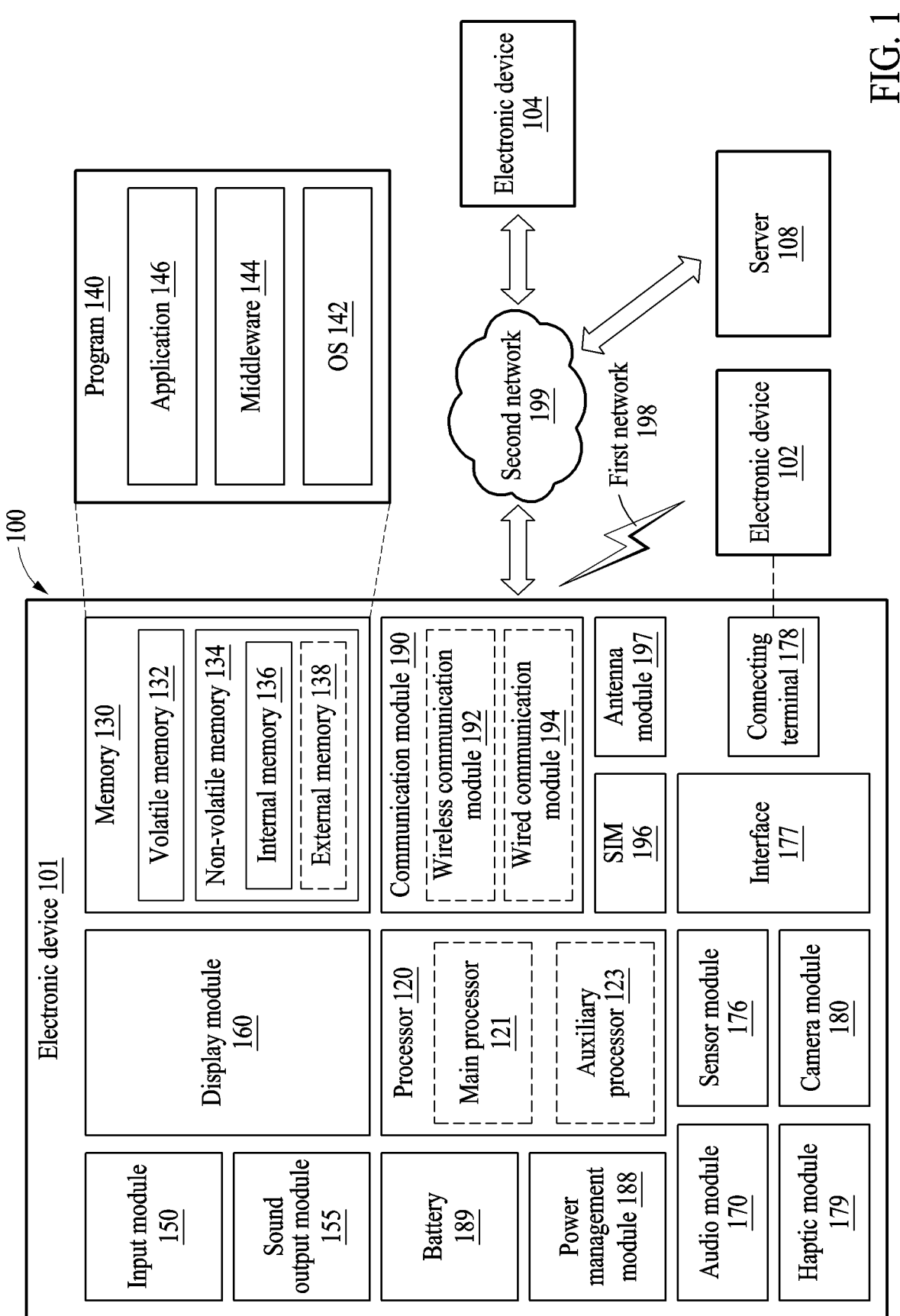
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, a block diagram illustrates an electronic device 101 in a network environment 100 according to various embodiments. Referring to FIG. 1, the electronic device 101 in the network environment 100 may communicate with an external electronic device 102 via a first network 198 (e.g., a short-range wireless communication network), or communicate with at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment of the disclosure, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., a sleep) state or along with the main processor 121 while the main processor 121 is in an active state (e.g., executing an application). According to an embodiment of the disclosure, the auxiliary processor 123 (e.g., an ISP or a CP) may be implemented as a portion of another component (e.g., the camera module 180 or the communication module 190) that is functionally related to the auxiliary processor 123. According to an embodiment of the disclosure, the auxiliary processor 123 (e.g., an NPU) may include a hardware structure specified for artificial intelligence model processing. An artificial intelligence (AI) model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment of the disclosure, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an embodiment of the disclosure, the display module 160 may include a touch sensor adapted to detect a touch, or a pressure sensor adapted to measure the intensity of force applied by the touch.

The audio module 170 may convert a sound into an electric signal or vice versa. According to an embodiment of the disclosure, the audio module 170 may obtain the sound via the input module 150 or output the sound via the sound output module 155 or an external electronic device (e.g., the external electronic device 102, such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., by wire) or wirelessly. According to an embodiment of the disclosure, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment of the disclosure, the haptic module 179 may include, for example, a motor, a piezoelectric element, or an electric stimulator.

The camera module 180 may capture a still image and moving images. According to an embodiment of the disclosure, the camera module 180 may include one or more lenses, image sensors, ISPs, or flashes.

The power management module 188 may manage power supplied to the electronic device 101. According to an embodiment of the disclosure, the power management module 188 may be implemented as, for example, at least a part of a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment of the disclosure, another component (e.g., a radio frequency integrated circuit (RFIC)) other than the radiating element may be additionally formed as a part of the antenna module 197.

According to various embodiments of the disclosure, the antenna module 197 may form a mmWave antenna module. According to an embodiment of the disclosure, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be the same in type as electronic device 101 or different in type than electronic device 101. According to an embodiment of the disclosure, all or some of operations to be executed by the electronic device 101 may be executed at one or more external electronic devices (e.g., the external electronic devices 102 and 104, and the server 108). For example, if the electronic device 101 needs to perform a function or a service automatically, or in response to a request from a user or another device, the electronic device 101, instead of, or in addition to, executing the function or the service, may transmit a request to one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment of the disclosure, the external electronic device 104 may include an Internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic device may include, for example, a portable communication device (e.g., a smartphone), a computer device, a portable multimedia device, a portable medical device, a camera, a wearable device, or a home appliance device. According to an embodiment of the disclosure, the electronic device is not limited to those described above.

It should be understood that various embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. Terms, such as "$1^{st}$," "$2^{nd}$", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via a third element.

As used in connection with embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiment of the disclosure s, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
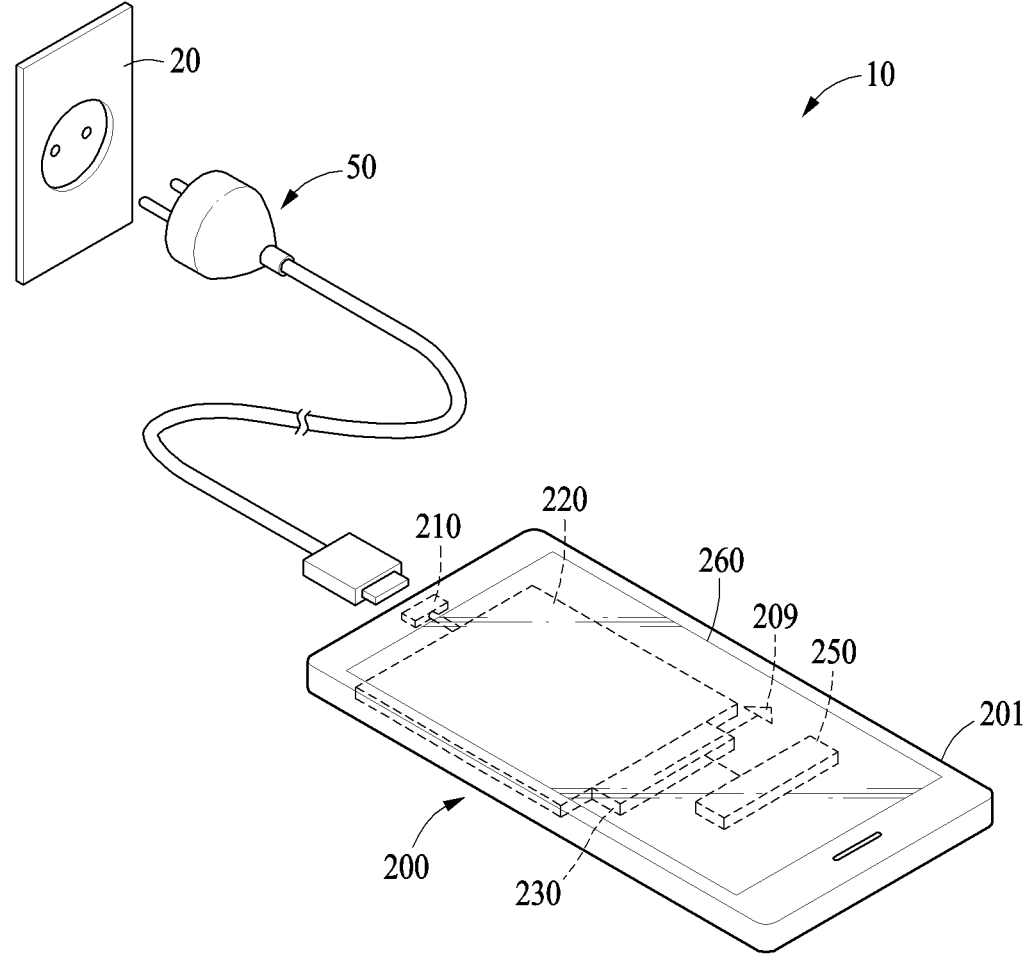
FIG. 2 illustrates a charging environment of an electronic device according to an embodiment of the disclosure.

FIG. 2 illustrates a charging environment of an electronic device according to an embodiment of the disclosure.

Referring to FIG. 2, a charging environment 10 may include a charger 50 (alternatively, a travel adapter (TA)) and an electronic device 200 (e.g., the electronic device 101 of FIG. 1). For example, the electronic device 200 may include a mobile communication terminal, a smartwatch, or smart glasses. Smart glasses may provide virtual reality or augmented reality to a user through a display, but embodiments are not limited thereto.

Referring to FIG. 2, in the charging environment 10, the charger 50 may connect to one side of a static power source 20 and transmit power supplied from the static power source 20 to the electronic device 200 that connects to the other side of the charger 50.

The electronic device 200 may include a charging interface 210 (e.g., the interface 177 of FIG. 1), a battery 220 (e.g., the battery 189 of FIG. 1), a power supply circuit 230 (e.g., the power management module 188 of FIG. 1), and a load 250. According to an embodiment of the disclosure, the electronic device 200 may further include a ground member 209 that helps ground the power supply circuit 230. The ground member 209 may include at least some components made of a metal material included in the electronic device 200. For example, the ground member 209 may include at least some of a ground region of a PCB included in the electronic device 200, at least a portion of a housing 201, a metal sheet on the rear surface of a display 260 (e.g., the display module 160 of FIG. 1), and a metal structure surrounding the battery 220. According to an embodiment of the disclosure, the electronic device 200 may further include the housing 201 and the display 260 that is on one surface of the housing 201 and is exposed through the one surface of the housing 201. The electronic device 200 may drive the display 260 using power charged to the battery 220 or power transmitted through the charging interface 210. The display 260 may output an object related to the amount of remaining battery charge of the battery 220.

For example, the charging interface 210 may have a socket shape into which one side of the charger 50 (e.g., a cable of the charger 50) is inserted. The charging interface 210 may transmit power transmitted through a wire to the power supply circuit 230. According to an embodiment of the disclosure, the charging interface 210 may include a USB interface or a micro-USB interface, but embodiments are not limited thereto.

The power supply circuit 230 may be electrically connected to the charging interface 210. According to an embodiment of the disclosure, the electronic device 200 may further include a signal wire (e.g., a flexible PCB (FPCB) or a PCB in which a cable or a signal line is formed) that electrically connects the power supply circuit 230 to the charging interface 210. The power supply circuit 230 may convert a voltage of power transmitted through the charging interface 210 and may charge the battery 220 using the converted power or supply the converted power to the load 250.

According to an embodiment of the disclosure, the power supply circuit 230 may stably supply power to the load 250 and efficiently charge the battery 220 by controlling the charge state and discharge state of the battery 220.

The load 250 may be electrically connected to the power supply circuit 230 and consume power stored in the battery 220 or power supplied through the charging interface 210. For example, the load 250 may include at least one processor (e.g., the processor 120 of FIG. 1). Alternatively, the load 250 may include the display 260 described above. Alternatively, the load 250 may include a component that operates with power supplied through the battery 220 or the charging interface 210 among at least one component in the electronic device 200. For example, the load 250 may include at least one of a camera module, a communication module, a speaker, a microphone, and at least one sensor.

Figure 3:
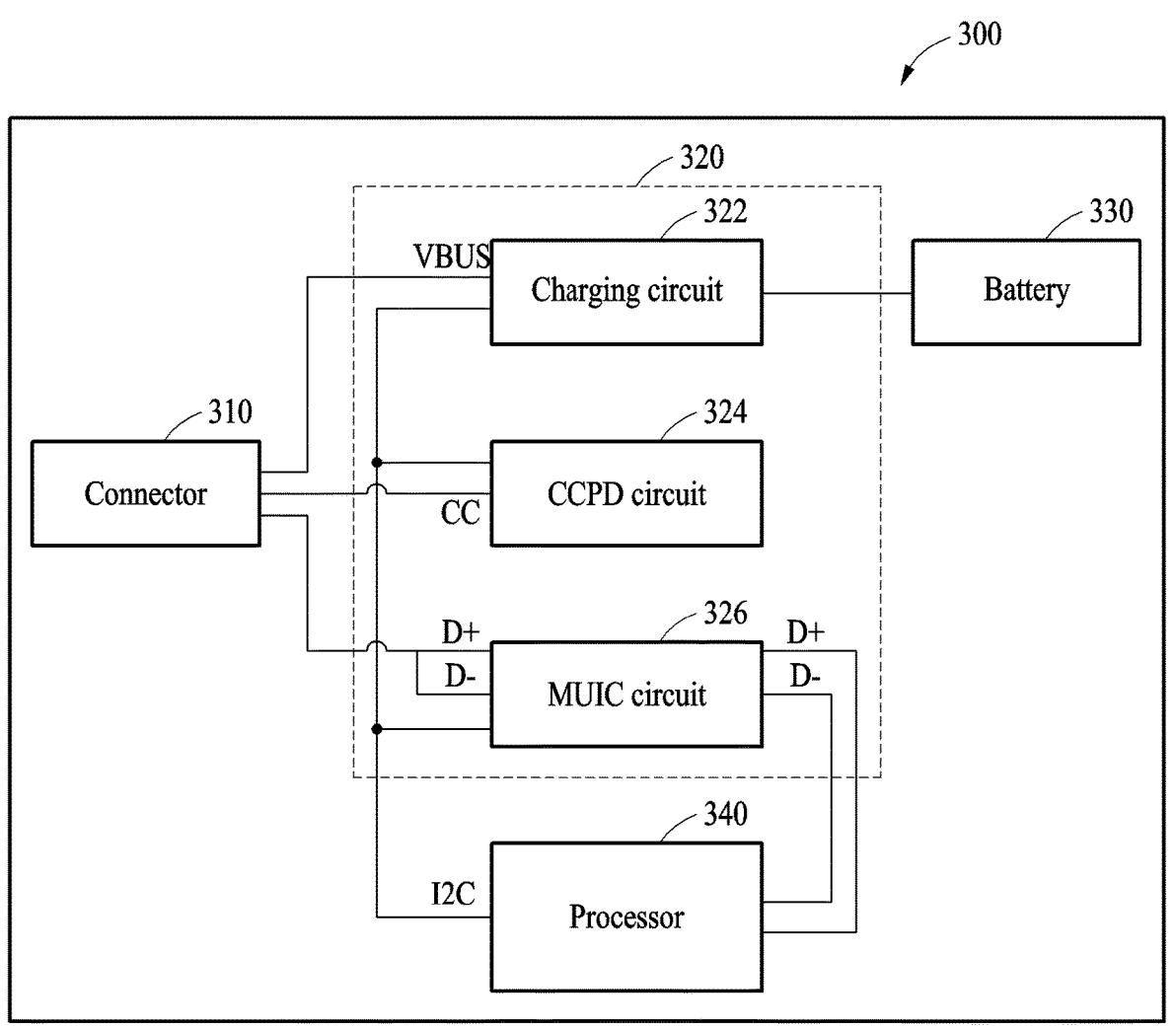
FIG. 3 illustrates a portion of an electronic device including a power supply circuit according to an embodiments of the disclosure.

FIG. 3 illustrates a portion of an electronic device including a power supply circuit according to an embodiment of the disclosure.

Referring to FIG. 3, an electronic device 300 (e.g., the electronic device 101 of FIG. 1 or the electronic device 200 of FIG. 2) may include a connector 310 (e.g., the charging interface 210 of FIG. 2), a power supply circuit 320 (e.g., the power management module 188 of FIG. 1 or the power supply circuit 230 of FIG. 2), a battery 330 (e.g., the battery 189 of FIG. 1 or the battery 220 of FIG. 2), and a processor 340 (e.g., the processor 120 of FIG. 1). For example, the processor 340 may be an AP and is not limited to the embodiment described herein.

According to one aspect, a USB type-C cable may connect to the connector 310. The connector 310 may receive information about a charger (e.g., the charger 50 of FIG. 2) through pins of a terminal of the cable. For example, the terminal of a USB type-C cable may include a side A and a side B. Pins of the side A thereof may include A1(GND), A2(TX1+), A3(TX1−), A4(VBUS), A5(CC1), A6(D+), A7(D−), A8(SBU1), A9(VBUS), A10(RX2−), A11(RX2+), and A12(GND). Pins of the side B thereof may include B1(GND), B2(TX2+), B3(TX2−), B4(VBUS), B5(CC2), B6(D+), B7(D−), B8(SBU2), B9(VBUS), B10(RX1−), B11(RX1+), and B12(GND).

CC may denote a configuration channel, SBU may denote sideband use, TX+ may denote super speed data line positive transmit, TX− may denote super speed data line negative transmit, RX+ may denote super speed data line positive receive, RX− may denote super speed data line negative receive, D+ may denote data line positive, D− may denote data line negative, and GND may denote ground. Data lines D+ and D− may be USB 2.0 high-speed data lines.

According to one aspect, the power supply circuit 320 may include a charging circuit 322, a CC power delivery (CC PD) circuit 324, and a micro-USB interface controller (MUIC) circuit 326.

The charging circuit 322 may receive power supplied from the charger through a VBUS pin of the cable. Using the received power, the charging circuit 322 may charge the battery 330. For example, the charging circuit 322 may include an overvoltage protector (OVP).

According to one aspect, the processor 340 may determine a charging mode (e.g., a low-speed charging mode, a normal charging mode, or a high-speed charging mode) based on at least some of the attributes of the battery 330 and the amount of power that may be supplied from the charger and may control the charging circuit 322 to charge the battery 330 using the determined charging mode. The amount of power that may be supplied from an external power source may be determined based on the CC PD circuit 324 and the MUIC circuit 326.

According to one aspect, the CC PD circuit 324 may measure the resistance value of the charger through the CC pin of the cable. The resistance value of the charger may vary depending on the charger. For example, the resistance value of the charger may be 10 kilo ohms, 22 kilo ohms, or 56 kilo ohms but is not limited to the embodiment described herein. The resistance value of the charger may vary depending on the product.

According to one aspect, the MUIC circuit 326 may determine a charging type of the charger based on a USB battery charging (US BC) algorithm (e.g., a BC 1.2 algorithm). For example, the MUIC circuit 326 may determine the charging type of the charger through the data lines D+ and D−. The determined charging type thereof may be one of a dedicated charging port (DCP) type, a charging downstream port (CDP) type, a standard downstream port (SDP) type, and a time-out type. For example, the MUIC circuit 326 may include an adaptive fast charging (AFC) algorithm that may determine whether the charger is capable of performing AFC. For example, the MUIC circuit 326 may include a quick charging (QC) algorithm that may determine whether the charger is capable of performing QC. According to an embodiment of the disclosure, the AFC algorithm and the QC algorithm may be performed in parallel or sequentially based on conditions.

According to one aspect, the processor 340 may control each of the charging circuit 322, the CC PD circuit 324, and the MUIC circuit 326 through an Inter-Integrated Circuit (I2C).

In general, a USB type-C charger may support the charging type of a DCP but may misrecognize the charging type as a CDP, SDP, or time-out type instead of a DCP type in an actual use environment due to an error in a physical connection between the cable of the charger and the connector 310. For example, when the impedance of the data line of the cable is changed by deterioration of the cable or a foreign material, the charging type may be misrecognized as a CDP, SDP, or time-out type instead of a DCP type. When a charging mode is misrecognized, low-speed charging may be performed even though the charger is actually capable of performing high-speed charging.

A method of determining the state of a charger and determining a charging mode for charging a battery based on the determined state is described below with reference to FIGS. 4 and 5.

According to one aspect, an electronic device may include the battery 330, the power supply circuit 320 electrically connected to the battery 330 and configured to charge the battery 330, and the processor 340 configured to control the power supply circuit 320.

For example, the processor 340 may determine the charging type of the charger through the cable when the cable of the charger for charging connects to the power supply circuit 320, may determine the target resistance value of the charger when the charging type is determined, and may charge the battery 330 using a charging mode corresponding to the determined charging type and target resistance value.

For example, the processor 340 may determine the charging type among a plurality of charging types through at least one of the data lines of the cable. The plurality of charging types may include at least one of DCP, CDP, SDP, and time-out types.

For example, the processor 340 may determine a target resistance value through a CC pin of the cable connecting to the power supply circuit 320.

For example, the processor 340 may determine whether a target resistance value corresponds to a preset resistance value and when the target resistance value does not correspond to the preset resistance value, may determine a charging mode based on the configuration of the cable.

For example, the processor 340 may determine whether the configuration of the cable is a preset configuration and when the configuration of the cable is the preset configuration, may determine a charging mode corresponding to the target resistance value. The preset configuration may be "HIGH" or "SUPER".

For example, the processor 340 may determine whether the configuration of the cable is a preset configuration and when the configuration of the cable is not the preset configuration, may determine a charging mode corresponding to the charging type.

For example, the processor 340 may determine whether a target resistance value corresponds to a preset resistance value. When the target resistance value does not correspond to the preset resistance value and the charging type is determined to be the time-out type, the processor 340 may determine the charging mode to be the one corresponding to the target resistance value.

For example, the processor 340 may determine whether a target resistance value corresponds to a preset resistance value and when the target resistance value corresponds to the preset resistance value, may determine a charging mode based on whether the charger is capable of performing AFC.

For example, the processor 340 may determine whether a target resistance value corresponds to a preset resistance value and when the target resistance value corresponds to the preset resistance value, may determine a charging mode based on whether the charger is capable of performing QC.

The electronic device 300 may be one of a mobile communication terminal, a smartwatch, and smart glasses.

Figure 4:
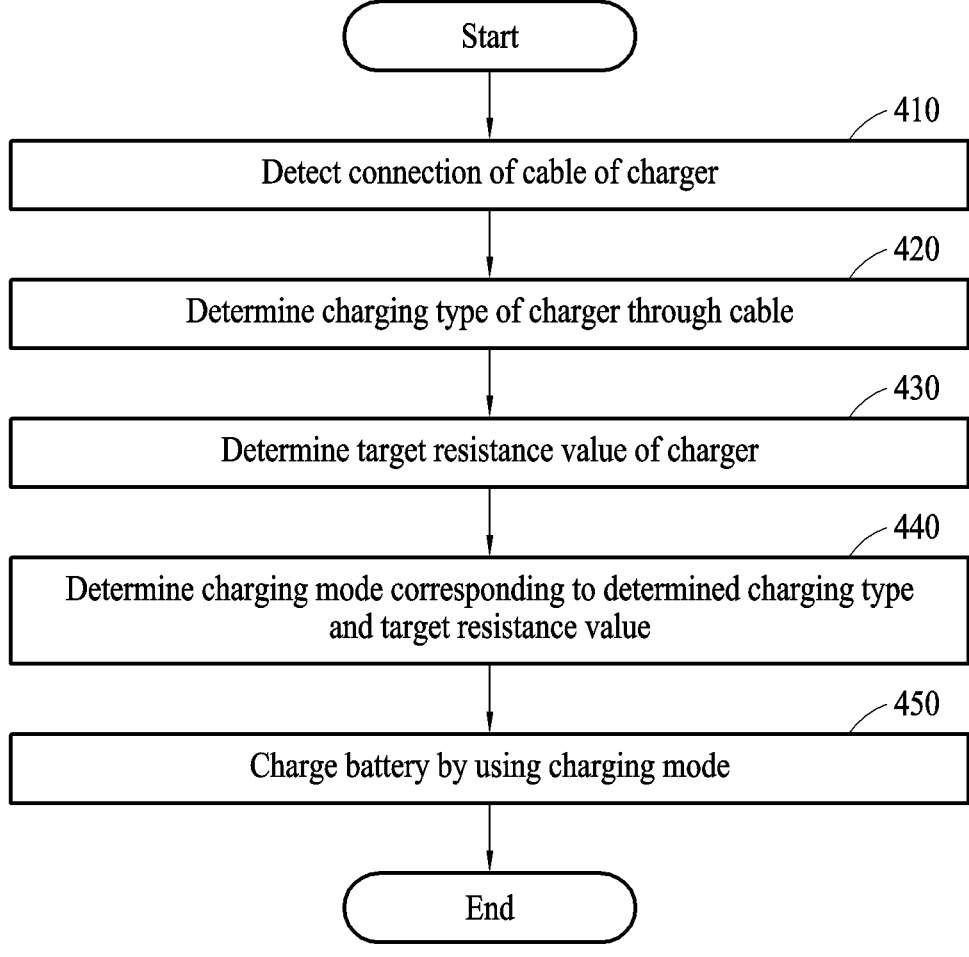
FIG. 4 is a flowchart of a method of charging a battery of an electronic device according to an embodiment of the disclosure.

FIG. 4 is a flowchart of a method of charging a battery of an electronic device according to an embodiment of the disclosure.

Referring to FIG. 4, operations 410 to 450 may be performed by an electronic device (e.g., the electronic device 101 of FIG. 1, the electronic device 200 of FIG. 2, or the electronic device 300 of FIG. 3).

In operation 410, a processor (e.g., the processor 120 of FIG. 1 or the processor 340 of FIG. 3) of the electronic device may detect the connection of a cable of a charger (e.g., the charger 50 of FIG. 2) to the electronic device. For example, the cable may be connected to the electronic device through a connector (e.g., the charging interface 210 of FIG. 2 or the connector 310 of FIG. 3) of the electronic device.

In operation 420, the processor may determine a charging type of the charger among a plurality of charging types through the cable. For example, the plurality of charging types may include DCP, CDP, SDP, and time-out types.

According to one aspect, the processor may control a power supply circuit (e.g., the power management module 188 of FIG. 1, the power supply circuit 230 of FIG. 2, or the power supply circuit 320 of FIG. 3) to determine a charging type of the charger. For example, using a USB BC algorithm (e.g., a BC 1.2 algorithm), a MUIC circuit (e.g., the MUIC circuit 326 of FIG. 3) of the power supply circuit may determine the charging type of the charger.

In operation 430, the processor may determine the target resistance value of the charger. For example, the target resistance value may be measured and determined via a CC pin of the cable.

According to one aspect, the processor may control the power supply circuit to determine the target resistance value of the charger. For example, the target resistance value of the charger may be determined by using a CC PD circuit (e.g., the CC PD circuit 324 of FIG. 3) of the power supply circuit.

Operation 430 may be performed regardless of the result of the charging type determined through operation 420.

In operation 440, the processor may determine a charging mode corresponding to the determined charging type and target resistance value. For example, the charging mode may be one of a low-speed charging mode, a normal charging mode, and a high-speed charging mode. A method of determining a charging state is described below with reference to FIG. 5.

In operation 450, using the charging mode determined through operation 440, the processor may charge a battery (e.g., the battery 189 of FIG. 1, the battery 220 of FIG. 2, or the battery 330 of FIG. 3) of the electronic device.

Figure 5:
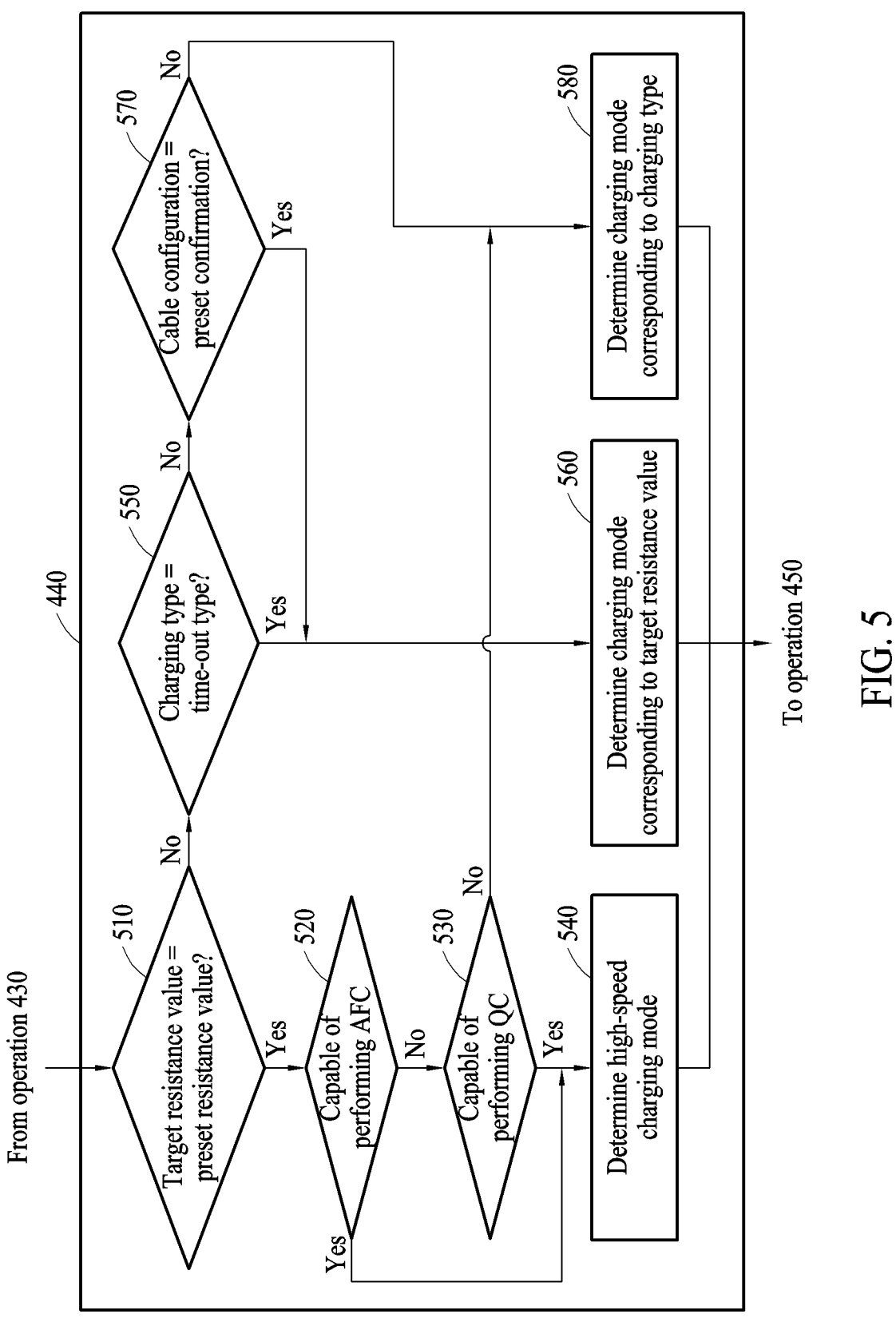
FIG. 5 is a flowchart of a method of determining a charging mode corresponding to a determined charging type and target resistance value according to an embodiment of the disclosure.

FIG. 5 is a flowchart of a method of determining a charging mode corresponding to a determined charging type and target resistance value according to an embodiment of the disclosure.

Referring to FIG. 5, according to one aspect, operation 440 described above with reference to FIG. 4 may include operations 510 to 580 to be described hereinafter.

In operation 510, a processor (e.g., the processor 120 of FIG. 1 or the processor 340 of FIG. 3) may determine whether the target resistance value of a charger (e.g., the charger 50 of FIG. 2) corresponds to a preset resistance value. For example, a preset resistance value may be 56 kilo ohms but is not limited to the embodiment described herein. Operation 520 may be performed when the target resistance value of the charger corresponds to the preset resistance value. Otherwise, operation 550 may be performed.

In operation 520, the processor may determine whether the charger is capable of performing AFC. When the charger is capable of performing AFC, operation 540 may be performed. Otherwise, operation 530 may be performed.

In operation 530, the processor may determine whether the charger is capable of performing QC. When the charger is capable of performing QC, operation 540 may be performed. Otherwise, operation 580 may be performed.

Although operation 530 is performed based on a result of operation 520 in the flowchart illustrated in FIG. 5, operation 530 may be performed when the result of operation 510 is "YES" and operation 520 may be performed when the result of operation 530 is "NO", according to an embodiment.

In operation 540, the processor may determine a charging mode to be a high-speed charging mode when the charger is capable of performing AFC or QC. For example, the high-speed charging mode may be a mode supporting charging power of a preset value (e.g., 12 Watts (W)) or more but the preset value may vary depending on the definition of the charging mode.

As a result of performing operation 510, when it is determined that the target resistance value of the charger does not correspond to the preset resistance value, operation 550 may be performed. For example, when a preset resistance value is 56 kilo ohms and a target resistance value is 10 kilo ohms or 22 kilo ohms, operation 550 may be performed.

In operation 550, the processor may determine whether the determined charging type of the charger is a time-out type. For example, the time-out type may be generated by data contact detect (DCD) time-out. When the charging type of the determined charger is a time-out type, operation 560 may be performed. Otherwise, operation 570 may be performed.

In operation 560, the processor may determine a charging mode corresponding to the determined target resistance value of the charger. A high-speed charging mode may be determined according to the target resistance value.

For example, when the target resistance value of the charger is 10 kilo ohms, a charging mode present to correspond to 10 kilo ohms may be determined. In another example, when the target resistance value of the charger is 22 kilo ohms, a charging mode preset to correspond to 22 kilo ohms may be determined.

As a result of operation 550, operation 570 may be performed when it is determined that the determined charging type of the charger is not a time-out type.

In operation 570, the processor may determine whether the configuration of the cable is a preset configuration. For example, the preset configuration may be "HIGH" or "SUPER" but is not limited to the embodiment described herein. When the determined configuration of the charger is a preset configuration, operation 560 may be performed. Otherwise, operation 580 may be performed.

In operation 580, the processor may determine a charging mode corresponding to the determined charging type of the charger. For example, when the charging type is a DCP type, a charging mode corresponding to the DCP type may be determined. In another example, when the charging type is a CDP type, a charging mode corresponding to the CDP type may be determined. In another example, when the charging type is an SDP type, a charging mode corresponding to the SDP type may be determined.

According to one aspect, a method, performed by an electronic device, of charging a battery may include determining a charging type of a charger through a cable (e.g., operation 420 of FIG. 4) when the cable of the charger for charging is connected to a power supply circuit of the electronic device, determining the target resistance value of the charger (e.g., operation 430 of FIG. 4) when the charging type is determined, determining a charging mode corresponding to the determined charging type and target resistance value (e.g., operation 440 of FIG. 4), and charging the battery using the charging mode (e.g., operation 450 of FIG. 4).

For example, operation 420 of determining the charging type of the charger through the cable may include determining the charging type based on a USB BC algorithm.

For example, operation 440 of determining the charging mode corresponding to the determined charging type and target resistance value may include operation 510 of determining whether the target resistance value corresponds to a preset resistance value and may include determining the charging mode based on the configuration of the cable when the target resistance value does not correspond to the preset resistance value.

For example, the determining of the charging mode based on the configuration of the cable when the target resistance value does not correspond to the preset resistance value may include operation 570 of determining whether the configuration of the cable is a preset configuration and operation 560 of determining the charging mode corresponding to the target resistance value when the configuration of the cable is the preset configuration.

For example, the determining of the charging mode based on the configuration of the cable when the target resistance value does not correspond to the preset resistance value may include operation 570 of determining whether the configuration of the cable is the preset configuration and operation 580 of determining the charging mode corresponding to the charging type when the configuration of the cable is not the preset configuration.

For example, operation 440 of determining the charging mode corresponding to the determined charging type and target resistance value may include operation 510 of determining whether the target resistance value corresponds to the preset resistance value and operation 560 of determining the charging mode corresponding to the target resistance value when the target resistance value does not correspond to the preset resistance value and the charging type is determined to be the time-out type.

For example, operation 440 of determining the charging mode corresponding to the determined charging type and target resistance value may include operation 510 of determining whether the target resistance value corresponds to the preset resistance value and may include determining the charging mode based on whether the charger is capable of performing AFC when the target resistance value corresponds to the preset resistance value.

Embodiments of Cables Having Specific Specifications

According to one aspect, a high-speed charging mode may be determined for a charger according to the charging method described above with reference FIGS. 4 and 5 when the charging type of the charger is SDP, the target resistance value is 10 kilo ohms, and the configuration of the cable is neither "HIGH" nor "SUPER" (e.g., N/A for the configuration of the cable).

According to a charging method in which a charging mode is determined based only on a charging type, rather than the charging method described above with reference to FIGS. 4 and 5, a low-speed charging mode may be determined for the charger.

The devices described above may be configured to act as one or more software modules in order to perform the operations of the examples described above, or vice versa.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a battery;
a power supply circuit electrically connected to the battery and configured to charge the battery;
memory storing one or more computer programs; and
one or more processors communicatively coupled to the power supply circuit and the memory,
wherein the one or more computer programs include computer-executable instructions that, when executed by the one or more processors individually or collectively, cause the electronic device to:
when a cable of a charger for charging is connected to the power supply circuit, determine a charging type of the charger through the cable,
when the charging type of the charger is determined, determine a target resistance value of the charger based on a resistance value of the charger measured through a configuration channel (CC) pin of the cable by a CC power delivery (PD) circuit of the power supply circuit,
determine whether the target resistance value corresponds to a preset resistance value,
based on the target resistance value corresponding to the preset resistance value, determine whether the charger is capable of supporting charging power of a preset value or more,
based on the charging type, the target resistance value, and a result of the determining of whether the charger is capable of supporting charging power of the preset value or more, determine a charging mode, and
charge the battery by using the charging mode.

2. The electronic device of claim 1, wherein the one or more computer programs further include computer-executable instructions that, when executed by the one or more processors individually or collectively, cause the electronic device to:
determine the charging type among a plurality of charging types through at least one of data lines of the cable.

3. The electronic device of claim 2, wherein the plurality of charging types comprises at least one of a dedicated charging port (DCP) type, a charging downstream port (CDP) type, a standard downstream port (SDP) type, or a time-out type.

4. The electronic device of claim 1, wherein the one or more computer programs further include computer-executable instructions that, when executed by the one or more processors individually or collectively, cause the electronic device to:
based on the target resistance value not corresponding to the preset resistance value, determine the charging mode based on a configuration of the cable.

5. The electronic device of claim 4, wherein the one or more computer programs further include computer-executable instructions that, when executed by the one or more processors individually or collectively, cause the electronic device to:
determine whether the configuration of the cable is a preset configuration, and
based on the configuration of the cable being the preset configuration, determine the charging mode as a mode corresponding to the target resistance value.

6. The electronic device of claim 5, wherein the preset configuration is at least one of a first preset configuration or a second preset configuration.

7. The electronic device of claim 4, wherein the one or more computer programs further include computer-executable instructions that, when executed by the one or more processors individually or collectively, cause the electronic device to:
determine whether the configuration of the cable is a preset configuration, and based on the configuration of the cable being the preset configuration, determine the charging mode as a mode corresponding to the charging type.

8. The electronic device of claim 1, wherein the one or more computer programs further include computer-executable instructions that, when executed by the one or more processors individually or collectively, cause the electronic device to:

based on the target resistance value not corresponding to the preset resistance value and the charging type is determined to be a time-out type, determine the charging mode as a mode corresponding to the target resistance value.

9. The electronic device of claim 1, wherein the one or more computer programs further include computer-executable instructions that, when executed by the one or more processors individually or collectively, cause the electronic device to:

based on the target resistance value corresponding to the preset resistance value, determine the charging mode based on whether the charger is capable of performing adaptive fast charging (AFC).

10. The electronic device of claim 1, wherein the one or more computer programs further include computer-executable instructions that, when executed by the one or more processors individually or collectively, cause the electronic device to:

based the target resistance value corresponding to the preset resistance value, determine the charging mode based on whether the charger is capable of performing quick charging (QC).

11. The electronic device of claim 1, wherein the electronic device includes one of a mobile communication terminal, a smartwatch, or smart glasses.

12. A method performed by an electronic device of charging a battery, the method comprising:

determining, by the electronic device, a charging type of a charger through a cable of the charger in response to the cable for charging being connected to a power supply circuit of the electronic device;

when the charging type of the charger is determined, determining, by the electronic device, a target resistance value of the charger based on a resistance value of the charger measured through a configuration channel (CC) pin of the cable by a CC power delivery (PD) circuit;

determining, by the electronic device, whether the target resistance value corresponds to a preset resistance value;

based on the target resistance value corresponding to the preset resistance value, determining, by the electronic device, whether the charger is capable of supporting charging power of a preset value or more;

based on the charging type, the target resistance value, and a result of the determining of whether the charger is capable of supporting charging power of the preset value or more, determining, by the electronic device, a charging mode; and charging, by the electronic device, the battery using the charging mode.

13. The method of claim 12, wherein the determining of the charging type of the charger through the cable of the charger comprises:

determining, by the electronic device, the charging type of the charger based on a universal serial bus (USB) battery charging (BC) algorithm.

14. An electronic device comprising:

a battery;

a power supply circuit electrically connected to the battery and configured to charge the battery;

memory storing one or more computer programs; and one or more processors communicatively coupled to the power supply circuit and the memory, wherein the one or more computer programs include computer-executable instructions that, when executed by the one or more processors individually or collectively, cause the electronic device to:

when a cable of a charger for charging is connected to the power supply circuit, determine a charging type of the charger through the cable, when the charging type of the charger is determined, determine a target resistance value of the charger based on a resistance value of the charger measured through a configuration channel (CC) pin of the cable by a CC power delivery (PD) circuit of the power supply circuit, determine whether the target resistance value corresponds to a preset resistance value, determine a charging mode corresponding to the target resistance value when the target resistance value does not correspond to the preset resistance value and the charging type is determined to be a time-out type, and charge the battery by using the charging mode.

15. The electronic device of claim 14, wherein the one or more computer programs further include computer-executable instructions that, when executed by the one or more processors individually or collectively, cause the electronic device to:

determine the charging mode based on a configuration of the cable when the target resistance value does not correspond to the preset resistance value and the charging type is not determined to be a time-out type.

16. The electronic device of claim 15, wherein the one or more computer programs further include computer-executable instructions that, when executed by the one or more processors individually or collectively, cause the electronic device to:

determine whether the configuration of the cable is a preset configuration, and determine the charging mode corresponding to the target resistance value when the configuration of the cable is the preset configuration.

17. The electronic device of claim 14, wherein the one or more computer programs further include computer-executable instructions that, when executed by the one or more processors individually or collectively, cause the electronic device to:

determine whether the target resistance value corresponds to a preset resistance value, and determine the charging mode based on whether the charger is capable of performing adaptive fast charging (AFC) when the target resistance value corresponds to the preset resistance value.

18. The electronic device of claim 14, wherein the one or more computer programs further include computer-executable instructions that, when executed by the one or more processors individually or collectively, cause the electronic device to:

determine whether the target resistance value corresponds to a preset resistance value, and determine the charging mode based on whether the charger is capable of performing quick charging (QC) when the target resistance value corresponds to the preset resistance value.

19. The electronic device of claim 14, wherein the electronic device is one of a mobile communication terminal, a smartwatch, or smart glasses.

\* \* \* \* \*